United States Patent
Kobayashi

[11] 3,724,606
[45] Apr. 3, 1973

[54] DISK BRAKE ASSEMBLY
[75] Inventor: Toyoaki Kobayashi, Kariya, Japan
[73] Assignee: Aisin Seiki Kabushiki Kaisha, Kariya, Japan
[22] Filed: Mar. 29, 1971
[21] Appl. No.: 128,844

[30] Foreign Application Priority Data
Mar. 30, 1970  Japan ........................... 45/26783

[52] U.S. Cl. .................. 188/72.5, 188/73.4, 188/370
[51] Int. Cl. ............................................. F16d 55/228
[58] Field of Search ......... 188/72.4, 72.5, 73.4, 73.3, 188/370

[56] References Cited
UNITED STATES PATENTS

| | | | |
|---|---|---|---|
| 3,608,678 | 9/1971 | Kobayashi | 188/73.4 X |
| 3,361,229 | 1/1968 | Swift | 188/72.4 |
| 3,522,866 | 8/1970 | Habersack | 188/73.6 |
| 3,199,633 | 8/1965 | Rodway | 188/73.4 X |
| 3,543,887 | 12/1970 | Hodkinson | 188/73.4 |

Primary Examiner—George E. A. Halvosa
Attorney—Sughrue, Rothwell, Mion, Zinn & Macpeak

[57] ABSTRACT

This invention relates to improvements in and relating to a disc brake assembly of the spot-acting type, especially for use with a powered vehicle such as automotive vehicle. More specifically, the invention relates to such a type of automotive brake unit, wherein a stationary brake cylinder having a pair of opposedly acting hydraulic pistons is positioned at one side of a rotatable brake disc and a movable plate is arranged as straddling said plate in a direction parallel to the axis of said disc when actuated upon by an indirectly acting type one of said pistons, while the other directly acting type piston is also being actuated.

The improvement resides in such that said movable plate is mounted at its one end by at least two support lugs formed diametrally opposite to each other on said indirectly acting piston and suspendedly mounted from U-shaped guide pins mounted in turn on a body member of said brake unit, for load distribution and the like purposes.

3 Claims, 6 Drawing Figures

INVENTOR
TOYOAKI KOBAYASHI
BY Sughrue, Rothwell, Mion, Zinn & Macpeak
ATTORNEYS

DISK BRAKE ASSEMBLY

This invention relates to improvements in and relating to a disc brake assembly of the spot-acting type, especially for use with a powered vehicle such as automotive vehicle. More specifically, the invention relates to such a type of automotive brake unit, wherein a stationary brake cylinder having a pair of opposedly acting hydraulic pistons is positioned at one side of a rotatable brake disc and a movable plate is arranged as straddling said disc, the braking action being carried into effect by moving said plate in a direction parallel to the axis of said disc.

As commonly known among those skilled in the art it is a very important factor, when generally speaking, for realization of an efficient brake unit for a vehicle wheel to set already at the design stage thereof the working quantity of the hydraulically braking liquid, preferably oil, to a certain predetermined amount usable in the working period of the braking unit. Especially, in the case of the disc brake unit, a certain large amount of brake oil is required on account of larger bore diameter of the hydraulic brake cylinder; and of a small freedom of design imposed by smaller available space around the vehicle wheel to which the brake unit is fitted. It should be noted that with use of a larger quantity of braking liquid in the hydraulic brake system invites a correspondingly and disadvantageously increased stroke of the brake pedal.

A further drawback of the conventional hydraulic brake unit of the above structure resides in a rather concentrated force transmission from the outer one of said hydraulic pistons to the torque-transmitting ring plate or yoke. In addition, it is further required to reduce as possible the distance between the force-receiving point and the force-applying point on the said ring plate along the inner periphery thereof, so as to improve its rigidity.

It is therefore an object of the invention to provide an improved hydraulic brake unit of the kind above referred to wherein the required quantity of braking liquid medium is substantially reduced without increase of the special requirements for the main working components of the unit and without sacrifice of rigidity thereof.

A further object of the invention is to provide a brake unit of the above kind, wherein the force-transmitting plate or yoke is subjected to well balanced and distributed load when transmitting the braking pressure effort from the outer piston of the actuator cylinder unit to one of the friction units.

A still further object is to provide an improved brake unit of the above kind, wherein the distance between the force-receiving point and the force-applying point to the related friction unit can be reduced to a possible minimum on the said plate or yoke.

These and further objects, features and advantages of the invention will become more apparent when read the following detailed description of the invention by reference to the accompanying drawings illustrative of a preferred embodiment of the invention.

Figure 1:
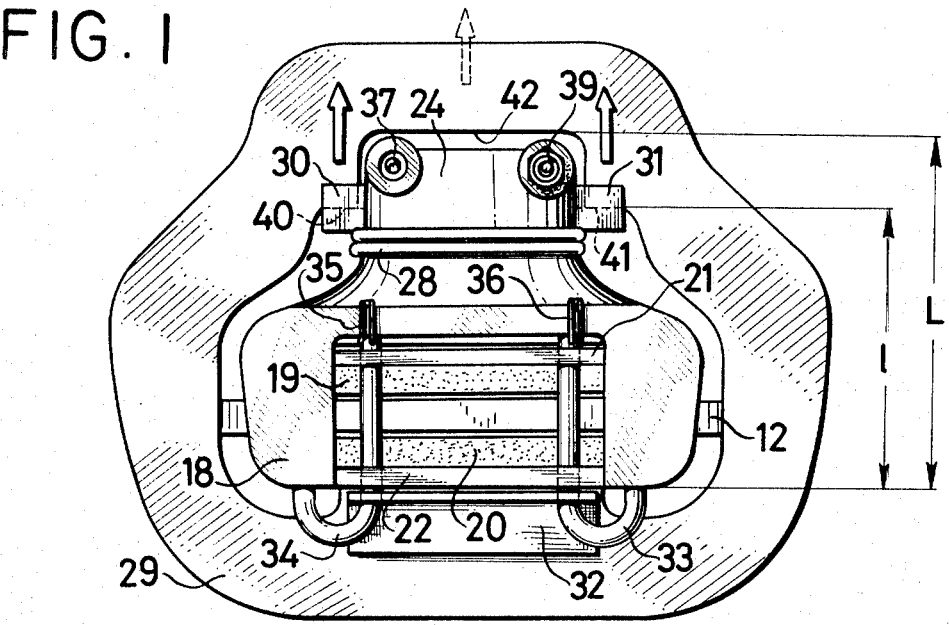
FIG. 1 is a top plan view of main working constituents of the hydraulically actuated wheel brake unit embodying the principle of the invention.
Figure 2:
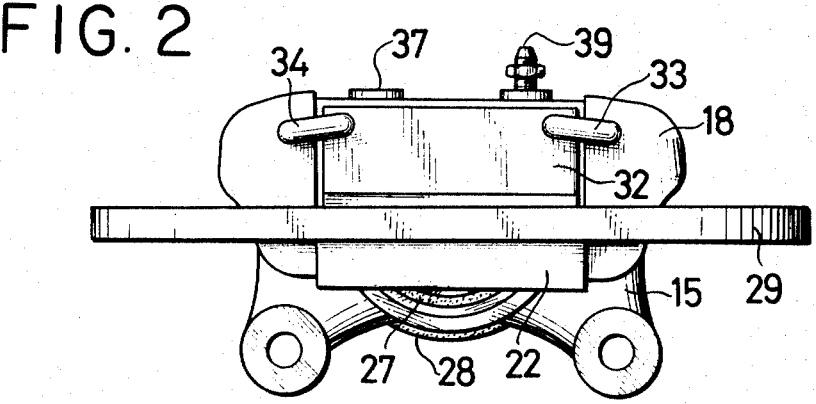
FIG. 2 is a front view thereof.

Referring now to the accompanying drawings, numeral 11 represents a certain non-rotatable stationary member such as conventional knuckle, or bracket fixedly attached thereto, frequently used in the disc-type wheel brake unit of the automotive vehicle and mounted rigidly on an automotive vehicle chassis thereof. Numeral 12 represents a brake disc rotatable in unison with a hub 13 and an automotive vehicle wheel as known per se, these members being shown only partially for simplicity of the drawing and on account of their popularity.

Disc brake body 15 is fixedly attached to the stationary member 11 by means of two sets of fixing bolts and nuts, of which one set only is shown at 43 as a representative thereof.

Figure 3:
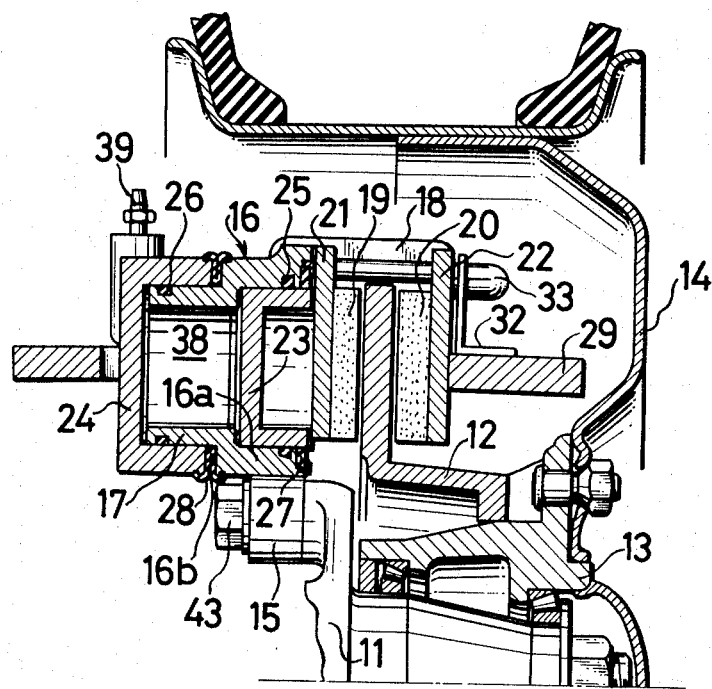
FIG. 3 is an axially sectioned view of the brake unit.

A cylinder 16 of stepped structure is provided at left-hand side of disc 12 and arranged axially perpendicular to the friction surfaces of the disc, as most clearly seen from FIG. 3. The outer reduced part of said cylinder 16 is denoted with 17, while the inner larger cylinder part is denoted with 16a.

Figure 4:
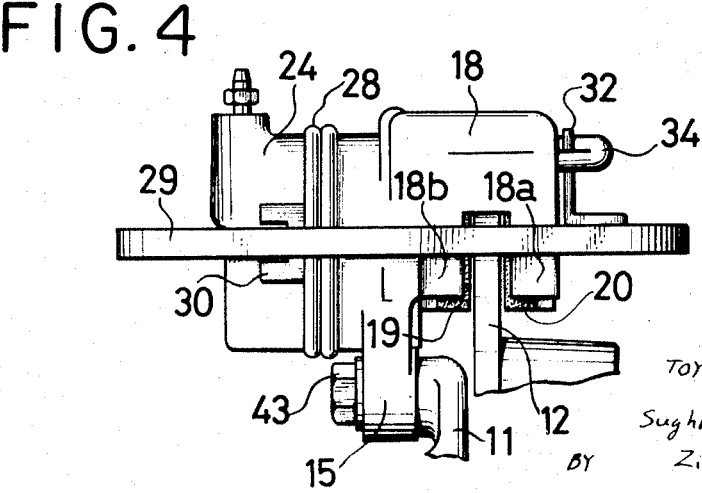
FIG. 4 is a side view thereof.

A torque-receiving member 18 is made integral with the body 15 and formed with a pair of projecting arms 18a and 18b which straddles the disc 12 axially thereof and with proper idle gaps as most clearly seen from FIG. 4.

A pair of friction pads 19 and 20 are arranged in close proximity to outer peripheral areas of the friction surfaces of disc 12 normally with slight idle gaps as seen and mounted fixedly on respective liner or backing plates 21 and 22 which are axially movable, as will be later described, although the fixedly attaching means such as glued connection, setting or the like conventional means have been omitted from the drawing only for simplicity. In this way, said arms 18a and 18b are adapted for receiving reaction torque transmitted from the disc 12, when the brake unit has been actuated, as will be described hereinafter.

A first or inner hydraulic piston 23 is axially slidably and sealingly mounted in the interior space formed in the inner larger cylinder part 16a of said cylinder 16, while a second or outer hydraulic piston 24 is slidably and sealingly mounted on the outer cylinder part 17. The necessary sealing means for these pistons 23 and 25 are shown at 25 and 26, respectively. A dust proof sealing ring 27 is provided additionally in the inner wall part of said cylinder part 16a for the first inner piston 23. As will be seen from the foregoing, these pistons 23 and 24 operate in the opposite directions relative to each other, when the brake is actuated.

A short resilient ring-shaped boot 28 is provided between the outer and ring-shaped shoulder 16b defining between said cylinder parts 16a and 17, on the one hand, and the inner end of the outer piston 24, on the other hand, so as to provide a dust-proof means therebetween. For this purpose, the both enlarged peripheral edges of the boot are fixedly attached to the related both parts by conventional fixing means such as tongue-and-groove connection, although not specifically shown.

Figure 5:
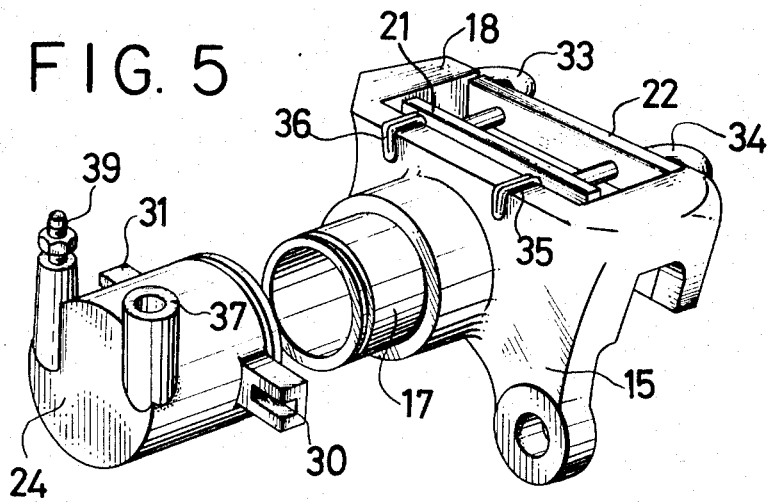
FIG. 5 is a partially exploded perspective view thereof wherein, however, a brake pressure-transmitting ring plate or yoke and a dust proof short resilient boot have been omitted from the drawing only for simplicity.

Outer piston 24 is formed rigidly at its both sides with a pair of outwardly extending support lugs 30 and 31 of a substantially channel section (FIG. 5), for mounting an irregularly shaped ring member which is arranged in an axial plane including the axis of said cylinder, so as to broadly enclose said body and said cylinder as a whole, and directs in a direction perpendicular to the disc 12 through the working area thereof. In this way, hydraulically applied brake pressure can be transmitted from the outer piston through the ring 29 to the second friction unit 20; 22 arranged at the opposite side of disc 12 relative to the first friction unit 19; 21.

Figure 6:
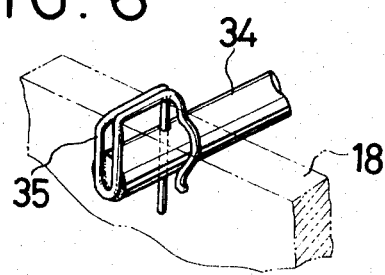
FIG. 6 is a perspective partial view illustrative of the attaching mode of the end of longer arm of one of two U-shaped guide pins for pressure pad backing plates, onto a stationary mounting member of the brake unit.

A pair of substantially U-shaped pins 33 and 34 are mounted by their sorter arms on the stationary body 18, said backing plates 21 and 22 and an angle piece 32 are slidably mounted on said pins 33 and 34, the inner ends of respective longer arms of which are detouchably mounted in turn by respective spring wire positioners 36 and 35 mounted on the torque-receiving parts 18, as representatively shown in FIG. 6. The angle piece 32 is fixedly attached onto the torque-receiving member 29. Thus, a rotational movement of the friction pads 19 and 20 can effectively prevented. It will be seen further that the member 29 is mounted by a four-point supporting means.

Numeral 37 denotes an inlet socket formed through the wall of outer piston 24 for receiving braking liquid from a proper supply source such as conventional master cylinder, not shown, and fluidically connected with the hydraulic chamber at 38 formed in the reduced cylinder part 17. An air vent socket 39 is provided again through the wall of the outer cylinder 24 for serving as air vent means from the hydraulic chamber 38.

The operation of the mechanism so far shown and described is as follows:

When an automotive driver actuates a brake pedal, not shown, pressurized braking liquid such as oil will be delivered as conventionally from the outlet of the master cylinder through a piping, not shown, to inlet socket 37 to the hydraulic chamber 38, thereby inner piston 23 being urged to move rightwards in FIG. 1, while outer piston is moved leftwards. By the rightward movement of first piston 23, the left-hand friction unit 21; 19 is urged to move against the left-hand surface of the rotating disc 19 when the vehicle is running, said backing plate 21 being slidingly guided along guide pins 33 and 34. By the leftward movement of second piston 24, motion will be transmitted through the mounting lugs 30 and 31 and the related cooperating shoulders 40 and 41 formed on the ring 29 and kept in engagement therewith to the latter, thereby the second friction unit 22; 20 being urged to move against the opposite or right-hand surface of disc 12, when seen in FIG. 3.

In this way, the disc 12 is squeezed with equal braking efforts from the both sides thereof by the pads 19 and 20.

The entraining force caused by the application of the braking effort will be borne by the body from inside thereof. It will be seen from the foregoing that the torque-transmission plate 29 is not practically affected by the aforementioned entraining force without giving rise to adverse effect upon the hydraulic braking action.

On the contrary, in the case of the conventional brake unit of similar type, the inside wall end 42 of torque-transmission plate as at 29 in the foregoing embodiment is kept in engagement with the outer piston 24 and thus, the hydraulic brake pressure exerted by the outer piston is substantially concentrated as shown by a double line arrow in FIG. 1 to a substantially degree which may give rise to a fracture of said transmission plate.

In the improved mechanism according to the present invention, brake force will be transmitted from the outer piston 24, through two substantially separated support lugs 30 and 31 formed diametrally opposite to each other on the piston, onto the plate 29 so that the otherwise used outer working end of the piston 24 does not serve in any way to transmit the braking effort towards the opposite friction unit such as at 20; 22 and the force-receiving point on the transmission plate 29 can be divided into two points 30 and 31 as denoted by two full line arrows and the lever arm is reduced from the conventional longer one denoted with "L" to a substantially smaller value "1" shown in FIG. 1, thereby considerably reducing the stresses in the yoke ring 29 and providing a substantially improved brake response. In addition, according to our practical experiments, a considerably reduced quantity of the braking liquid and a smaller dimensioning of the overall main sizes of the pressure-transmitting plate 29 can be realized. Thanks to the aforementioned merits, several parts of the brake unit according to the invention can be built with light alloy in place of iron.

Several minor structural alterations may also be carried into effect within the framework of the invention. As an example, brake oil supply socket and air vent socket may be provided through the wall of the stationary cylinder in place of the movable second hydraulic piston.

When necessary, said two support lugs may be increased in their number, although such modified structure has been omitted from the drawing by virtue of obviousness from the foregoing disclosure.

The embodiments of the invention in which an exclusive property or privilege is claimed are as follows:

1. A disk type wheel brake unit for a vehicle wheel comprising a brake disk rotatable in unison with a wheel to be braked, two movable friction pad units arranged at opposite sides of said brake disk for frictional cooperation therewith, a hydraulically operated cylinder unit having two oppositely actuatable hydraulic pistons movable relative thereto, means for stationarily mounting said cylinder unit at one side of said disk, and a ring-shaped transmission member straddling said disk, one of said pistons being slidably mounted therein, one of said friction units being in direct operative engagement with said one of said pistons and the other friction unit being in indirect operative engagement with the other hydraulic piston through said transmission member, said other hydraulic piston being slidably mounted on the external surface of said cylinder and having at least two outwardly extending diametrically opposed support lugs disposed adjacent the end of said other piston closest to said brake disk in the plane of said transmission member for engaging said transmission member at two widely spaced points so as to distribute the load applied to said ring-shaped transmission member.

2. A disk type brake unit as set forth in claim 1, wherein said cylinder unit is formed as a stepped cylinder having a larger diameter portion and a smaller diameter portion, said one of said pistons being slidably mounted within the larger diameter portion of said cylinder and said other piston being slidably mounted on the external surface of the smaller diameter portion of said cylinder.

3. A disk type brake unit as set forth in claim 2, wherein a plurality of guide pins are rigidly mounted on said cylinder unit and said friction pad units include backing plates, said backing plates being slidably mounted on said guide pins and further comprising suspension means suspended from said guide pins and rigidly secured to said ring-shaped transmission member.

* * * * *